US 11,869,143 B2

(12) United States Patent
Wang et al.

(10) Patent No.: US 11,869,143 B2
(45) Date of Patent: Jan. 9, 2024

(54) CUTTING METHOD, APPARATUS AND SYSTEM FOR POINT CLOUD MODEL

(71) Applicant: Siemens Ltd., China, Beijing (CN)

(72) Inventors: Hai Feng Wang, Shanghai (CN); Tao Fei, Shanghai (CN)

(73) Assignee: Siemens Ltd., China, Beijing (CN)

( * ) Notice: Subject to any disclaimer, the term of this patent is extended or adjusted under 35 U.S.C. 154(b) by 91 days.

(21) Appl. No.: 17/620,790

(22) PCT Filed: Jun. 28, 2019

(86) PCT No.: PCT/CN2019/093894
§ 371 (c)(1),
(2) Date: Dec. 20, 2021

(87) PCT Pub. No.: WO2020/258314
PCT Pub. Date: Dec. 30, 2020

(65) Prior Publication Data
US 2022/0358717 A1   Nov. 10, 2022

(51) Int. Cl.
*G06T 17/00*    (2006.01)
*G06T 19/00*    (2011.01)

(52) U.S. Cl.
CPC .............. *G06T 17/00* (2013.01); *G06T 19/00* (2013.01); *G06T 2210/56* (2013.01)

(58) Field of Classification Search
None
See application file for complete search history.

(56) References Cited

U.S. PATENT DOCUMENTS

| 7,760,932 B2 * | 7/2010 | Lee ...................... G06V 10/10 |
| | | 382/154 |
| 2011/0254845 A1 | 10/2011 | Oikawa et al. |
| 2013/0293532 A1 | 11/2013 | Vaddadi et al. |
| 2016/0012647 A1 | 1/2016 | Chen et al. |
| 2017/0276823 A1 * | 9/2017 | Chen .................... G01V 5/005 |
| 2019/0179027 A1 * | 6/2019 | Englard .................. G06T 15/08 |
| 2020/0380706 A1 * | 12/2020 | Gorodetsky ........... G06V 20/20 |

FOREIGN PATENT DOCUMENTS

| CN | 105678753 A | 6/2016 |
| CN | 105785462 A | 7/2016 |

OTHER PUBLICATIONS

International Search Report and Written Opinion dated Mar. 18, 2020.

* cited by examiner

*Primary Examiner* — Saptarshi Mazumder
(74) *Attorney, Agent, or Firm* — Harness, Dickey & Pierce, P.L.C.

(57) ABSTRACT

Provided are a cutting method, apparatus and system for a point cloud model. In an embodiment, the method includes: using one two-dimensional first cutting window to select a point cloud structure comprising a target object from among one point cloud model; adjusting the depth of the first cutting window, the length, width and depth of the first cutting window constituting one three-dimensional second cutting window, the target object being located in the second cutting window; identifying and marking all point cloud structures in the second cutting window to form a plurality of three-dimensional third cutting windows, the target object being located in one of the third cutting windows; and calculating the volume ratio of the point cloud structure in each third cutting window relative to the second cutting window, and selecting the third cutting window having the largest volume ratio.

10 Claims, 5 Drawing Sheets

CUTTING METHOD, APPARATUS AND SYSTEM FOR POINT CLOUD MODEL

PRIORITY STATEMENT

This application is the national phase under 35 U.S.C. § 371 of PCT International Application No. PCT/CN2019/093894 which has an International filing date of Jun. 28, 2019, which designated the United States of America, the entire contents of which are hereby incorporated herein by reference.

FIELD

Embodiments of the present invention generally relate to the field of modeling, and in particular to a method, an apparatus, and a system for segmenting a point cloud model.

BACKGROUND

Nowadays, the application of red green blue (RGB)-depth (D) cameras has received more and more attention. Compared with RGB cameras, RGB-D cameras can provide point cloud images having depth information, which means that many scenes in the real world can be captured by RGB-D cameras, for example, in a digital twin in autonomous factories and environment awareness in autonomous robots, and accordingly, point cloud images in RGB-D cameras are intensively studied.

RGB-D cameras can help end users who can obtain different types of RGB-D cameras to easily obtain color and depth information. However, for end users, RGB-D cameras have only limited technologies and tool geometry to provide pruning and editing of autonomous three-dimensional (3D) data.

Point cloud segmenting serving as the primary method for processing a point cloud image is of great importance in the field of computer vision due to its capability to select targets from point cloud images for many secondary tasks. The secondary tasks include point cloud registration, point cloud positioning, robot grasping, etc. However, sensors therein can bring a lot of noise. In addition, the raw point cloud image includes an incoherent point cloud of many backgrounds or other targets, and the incoherent point cloud can greatly hinder the segmenting of a 3D model, and therefore, a practical tool for segmenting a 3D point cloud needs to be used. Traditional tools for segmenting a point cloud cannot make a user select a particular depth of the point cloud image from a certain point of view, which means that it is not possible to always select the point cloud that the user desires. Moreover, traditional tools for segmenting a point cloud rely on user interfaces that do not have semantic functions, which results in incapability of the user to automatically select the targets that users desire.

So far, how to obtain semi-automatic or automatic methods for pruning and extracting 3D point cloud data having target geometric features is still a big problem to be solved for 3D reconstruction and 3D robot cognition. The prior art also provides several manual methods or tools, such as CloudCompare3D, which can assist a user in selecting and pruning 3D point cloud data. However, such software does not support semi-automatic or automatic methods. In addition, the mechanism of CloudCompare3D lacks depth information when the user selects or prunes 3D point cloud data.

The prior art further provides some mechanisms for segmenting a 3D point cloud, which provide a system including an optical camera data processing unit that can obtain a 3D point cloud scene including a target object. By using an exchange input apparatus, a user can input a seed indicating a position of the target object. Finally, the segmentation method may generate a point cloud obtained through segmentation and corresponding to the target object by pruning the 3D point cloud based on a position reference input by the user.

SUMMARY

A first embodiment of the present invention provides a method for segmenting a point cloud model, the method including the following steps: S1, selecting a point cloud structure including a target object from a point cloud model by using a two-dimensional first segmentation window, where the first segmentation window has a length and a width; S2, adjusting (e.g., adding) a depth of the first segmentation window, where the length, the width, and the depth of the first segmentation window constitute a three-dimensional second segmentation window, and the target object is located in the second segmentation window; S3, identifying and marking all point cloud structures in the second segmentation window to form a plurality of three-dimensional third segmentation windows, where the target object is located in one of the third segmentation windows; and S4, computing a volume proportion of a point cloud structure in each third segmentation window relative to the second segmentation window, selecting a third segmentation window having the largest volume proportion, and determining that the point cloud structure in the third segmentation window is the target object, where the third segmentation window is smaller than the second segmentation window.

located in one of the third segmentation windows.

A second embodiment of the present invention provides a system for segmenting a point cloud model, the system including: a processor; and a memory coupled to the processor, where the memory stores instructions that, when executed by the processor, cause the electronic device to perform actions including: S1, selecting a point cloud structure including a target object from a point cloud model by using a two-dimensional first segmentation window, where the first segmentation window has a length and a width; S2, adjusting (e.g., adding) a depth of the first segmentation window, where the length, the width, and the depth of the first segmentation window constitute a three-dimensional second segmentation window, and the target object is located in the second segmentation window; S3, identifying and marking all point cloud structures in the second segmentation window to form a plurality of three-dimensional third segmentation windows, where the target object is located in one of the third segmentation windows; and S4, computing a volume proportion of a point cloud structure in each third segmentation window relative to the second segmentation window, selecting a third segmentation window having the largest volume proportion, and determining that the point cloud structure in the third segmentation window is the target object, where the third segmentation window is smaller than the second segmentation window.

A third embodiment of the present invention provides an apparatus for segmenting a point cloud model, the apparatus including: a first segmentation apparatus configured to select a point cloud structure including a target object from a point cloud model by using a two-dimensional first segmentation window, where the first segmentation window has a length and a width; a depth adjustment apparatus configured to adjust (e.g., add) a depth of the first segmentation window, where the length, the width, and the depth of the first segmentation window constitute a three-dimensional second segmentation window, and the target object is located in the second segmentation window; a second segmentation apparatus configured to identify and mark all point cloud structures in the second segmentation window to form a plurality of three-dimensional third segmentation windows, where the target object is located in one of the third segmentation windows; and a computing apparatus configured to compute a volume proportion of a point cloud structure in each third segmentation window relative to the second segmentation window, select a third segmentation window having the largest volume proportion, and determine that the point cloud structure in the third segmentation window is the target object, where the third segmentation window is smaller than the second segmentation window.

A fourth embodiment of the present invention provides a computer program product tangibly stored on a computer-readable medium and including computer executable instructions that, when executed, cause at least one processor to perform the method according to the first embodiment of the present invention.

A fifth embodiment of the present invention provides a computer-readable medium storing computer executable instructions that, when executed, cause at least one processor to perform the method according to the first embodiment of the present invention.

DETAILED DESCRIPTION OF EXAMPLE EMBODIMENTS

A first embodiment of the present invention provides a method for segmenting a point cloud model, the method including the following steps: S1, selecting a point cloud structure including a target object from a point cloud model by using a two-dimensional first segmentation window, where the first segmentation window has a length and a width; S2, adjusting (e.g., adding) a depth of the first segmentation window, where the length, the width, and the depth of the first segmentation window constitute a three-dimensional second segmentation window, and the target object is located in the second segmentation window; S3, identifying and marking all point cloud structures in the second segmentation window to form a plurality of three-dimensional third segmentation windows, where the target object is located in one of the third segmentation windows; and S4, computing a volume proportion of a point cloud structure in each third segmentation window relative to the second segmentation window, selecting a third segmentation window having the largest volume proportion, and determining that the point cloud structure in the third segmentation window is the target object, where the third segmentation window is smaller than the second segmentation window.

Further, in at least one embodiment, step S3 further includes the following steps: S31, computing the number k of third segmentation windows; S32, randomly selecting k points in all the point cloud structures in the second segmentation window as centroids, then computing distances from other points in all the point cloud structures to the centroids by taking the seed centroids as cluster centers, assigning other points in all the point cloud structures to the closest centroid to form a cluster, and iteratively performing steps S31 and S32 until positions of the k centroids are no longer changed; and S33, identifying and marking all the point cloud structures in the second segmentation window to form k three-dimensional third segmentation windows, where the k third segmentation windows include k clusters.

Further, in at least one embodiment, step S3 further includes the following steps: training a sample of the target object by using a data set of the target object, and comparing the target object by using the sample of the target object, so as to identify and mark all the point cloud structures in the second segmentation window to form the plurality of three-dimensional third segmentation windows, where the target object is located in one of the third segmentation windows.

A second embodiment of the present invention provides a system for segmenting a point cloud model, the system including: a processor; and a memory coupled to the processor, where the memory stores instructions that, when executed by the processor, cause the electronic device to perform actions including: S1, selecting a point cloud structure including a target object from a point cloud model by using a two-dimensional first segmentation window, where the first segmentation window has a length and a width; S2, adjusting (e.g., adding) a depth of the first segmentation window, where the length, the width, and the depth of the first segmentation window constitute a three-dimensional second segmentation window, and the target object is located in the second segmentation window; S3, identifying and marking all point cloud structures in the second segmentation window to form a plurality of three-dimensional third segmentation windows, where the target object is located in one of the third segmentation windows; and S4, computing a volume proportion of a point cloud structure in each third segmentation window relative to the second segmentation window, selecting a third segmentation window having the largest volume proportion, and determining that the point cloud structure in the third segmentation window is the target object, where the third segmentation window is smaller than the second segmentation window.

Further, in at least one embodiment, action S3 further includes: S31, computing the number k of third segmentation windows; S32, randomly selecting k points in all the point cloud structures in the second segmentation window as centroids, then computing distances from other points in all the point cloud structures to the centroids by taking the seed centroids as cluster centers, assigning other points in all the point cloud structures to the closest centroid to form a cluster, and iteratively performing steps S31 and S32 until positions of the k centroids are no longer changed; and S33, identifying and marking all the point cloud structures in the second segmentation window to form k three-dimensional third segmentation windows, where the k third segmentation windows include k clusters.

Further, in at least one embodiment, action S3 further includes: training a sample of the target object by using a data set of the target object, and comparing the target object by using the sample of the target object, so as to identify and mark all the point cloud structures in the second segmentation window to form the plurality of three-dimensional third segmentation windows, where the target object is located in one of the third segmentation windows.

A third embodiment of the present invention provides an apparatus for segmenting a point cloud model, the apparatus including: a first segmentation apparatus configured to select a point cloud structure including a target object from a point cloud model by using a two-dimensional first segmentation window, where the first segmentation window has a length and a width; a depth adjustment apparatus configured to adjust (e.g., add) a depth of the first segmentation window, where the length, the width, and the depth of the first segmentation window constitute a three-dimensional second segmentation window, and the target object is located in the second segmentation window; a second segmentation apparatus configured to identify and mark all point cloud structures in the second segmentation window to form a plurality of three-dimensional third segmentation windows, where the target object is located in one of the third segmentation windows; and a computing apparatus configured to compute a volume proportion of a point cloud structure in each third segmentation window relative to the second segmentation window, select a third segmentation window having the largest volume proportion, and determine that the point cloud structure in the third segmentation window is the target object, where the third segmentation window is smaller than the second segmentation window.

Further, in at least one embodiment, the second segmentation apparatus is further configured to compute the number k of third segmentation windows, randomly select k points in all the point cloud structures in the second segmentation window as centroids, then compute distances from other points in all the point cloud structures to the centroids by taking the seed centroids as cluster centers, assign other points in all the point cloud structures to the closest centroid to form a cluster until positions of the k centroids are no longer changed, and identify and mark all the point cloud structures in the second segmentation window to form k three-dimensional third segmentation windows, where the k third segmentation windows include k clusters.

Further, in at least one embodiment, the second segmentation apparatus is further configured to train a sample of the target object by using a data set of the target object, and compare the target object by using the sample of the target object, so as to identify and mark all the point cloud structures in the second segmentation window to form the plurality of three-dimensional third segmentation windows, where the target object is located in one of the third segmentation windows.

A fourth embodiment of the present invention provides a computer program product tangibly stored on a computer-readable medium and including computer executable instructions that, when executed, cause at least one processor to perform the method according to the first embodiment of the present invention.

A fifth embodiment of the present invention provides a computer-readable medium storing computer executable instructions that, when executed, cause at least one processor to perform the method according to the first embodiment of the present invention.

A mechanism for segmenting a point cloud model according to an embodiment of the present invention may consider originally omitted depth information of a 3D point cloud model, and the present invention may automatically screen out a target object and send same to a client. In addition, at least one embodiment of the present invention utilizes a clustering manner, a deep learning manner, etc. to screen the target object.

Specific embodiments of the present invention are described below in conjunction with the accompanying drawings.

At least one embodiment of the present invention provides a mechanism for segmenting a point cloud model, which uses a three-dimensional segmentation window to accurately lock a target object in a point cloud model and selects the target object in the point cloud model by using a volume proportion.

Figure 1:
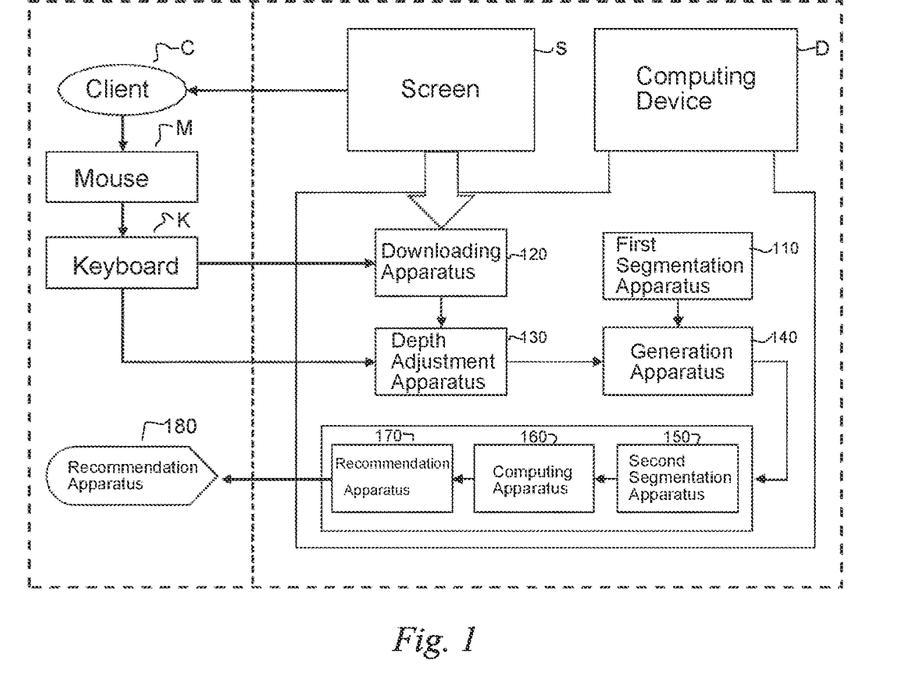
FIG. 1 is an architectural diagram of a system for segmenting a point cloud model according to a specific embodiment of the present invention.

As shown in FIG. 1, a system for segmenting a point cloud model includes a software module and a hardware device. The hardware device includes a screen S and a computing device D. The screen S has a hardware interface for the computing device D, such as a high-definition multimedia interface (HDMI) or a video graphics array (VGA) port, which has a capability of displaying graphical data of the computing device D, and displays the data to a client C. The computing device D has hardware interfaces for the screen S, a mouse M, and a keyboard K, which have a computing capability to download a point cloud model or a point cloud structure. The mouse M and the keyboard K are input apparatuses for the client C, and the computing device D may display data to the client C via the screen S.

The software module includes a first segmentation apparatus 110, a downloading apparatus 120, a depth adjustment apparatus 130, a generation apparatus 140, a second segmentation apparatus 150, a computing apparatus 160, and recommendation apparatuses 170 and 180. The downloading apparatus 120 is configured to download a large amount of data of a point cloud model 200, and display the point cloud model 200 on the screen S. The first segmentation apparatus 110 selects a point cloud structure including a target object from the point cloud model by using a two-dimensional first segmentation window. The depth adjustment apparatus 130 adjusts (e.g., adds) a depth of the first segmentation window to form a three-dimensional second segmentation window. The generation apparatus 140 receives configurations and parameters of the downloading apparatus 120 and the depth adjustment apparatus 130 and generates the second segmentation window serving as a limiting frame based on an input of a user. The second segmentation apparatus 150 identifies and marks all point cloud structures in the second segmentation window to form a plurality of three-dimensional third segmentation windows, where the target object is located in one of the third segmentation windows. The computing apparatus 160 computes a volume proportion of a point cloud structure in each third segmentation window relative to the second segmentation window, selects a third segmentation window having the largest volume proportion, and determines that the point cloud structure in the third segmentation window is the target object.

A first embodiment of the present invention provides a method for segmenting a point cloud model, the method including the following steps:

Step S1 is performed first. The first segmentation apparatus 110 selects a point cloud structure including a target object from a point cloud model by using a two-dimensional first segmentation window, where the first segmentation window has a length and a width.

Figure 2:
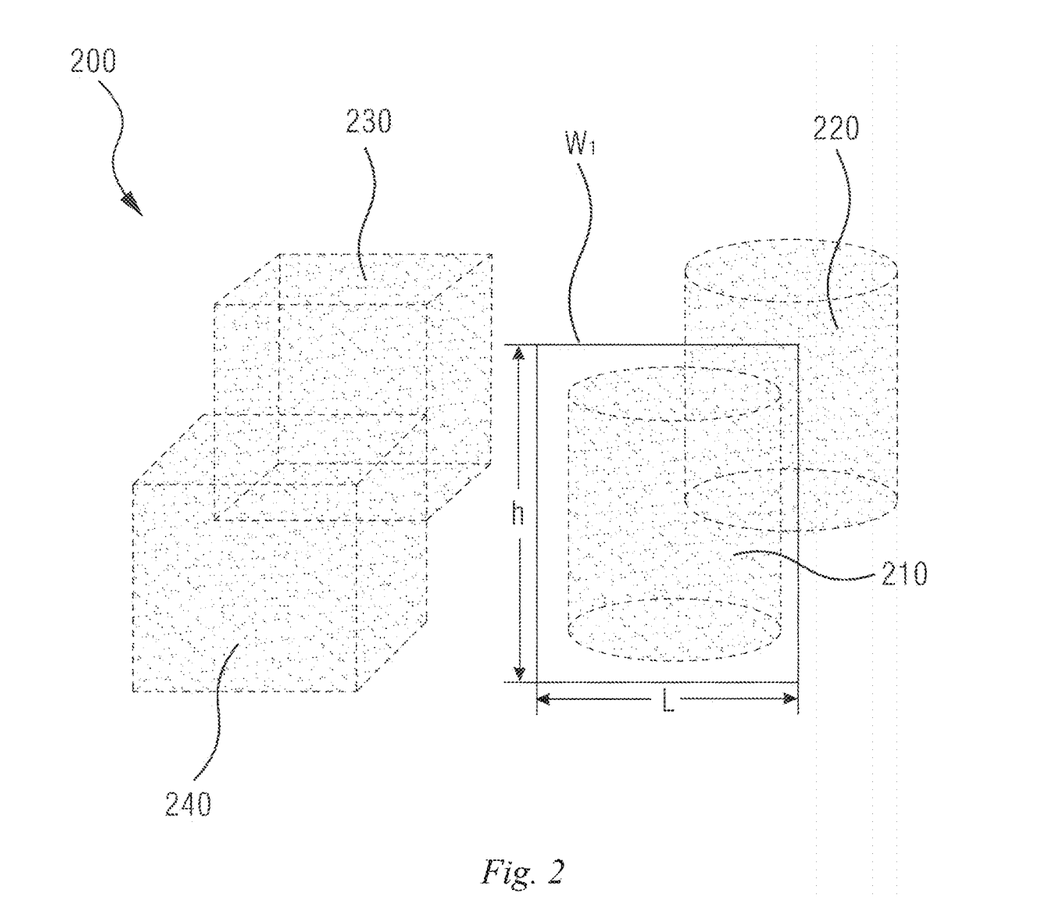
FIG. 2 is a schematic diagram of a point cloud model and a first segmentation window of a mechanism for segmenting a point cloud model according to a specific embodiment of the present invention.

As shown in FIG. 2, the downloading apparatus 120 is configured to download a large amount of data of one point cloud model 200 and display the point cloud model 200 on the screen S. In this embodiment, the point cloud model 200 includes a first cylinder 210, a second cylinder 220, a first cube 230, a second cube 240, and other redundant point cloud structures (not shown). The first cylinder 210, the second cylinder 220, the first cube 230, and the second cube 240 are all point cloud structures. The target object in the point cloud structures is the first cylinder 210.

Figure 3:
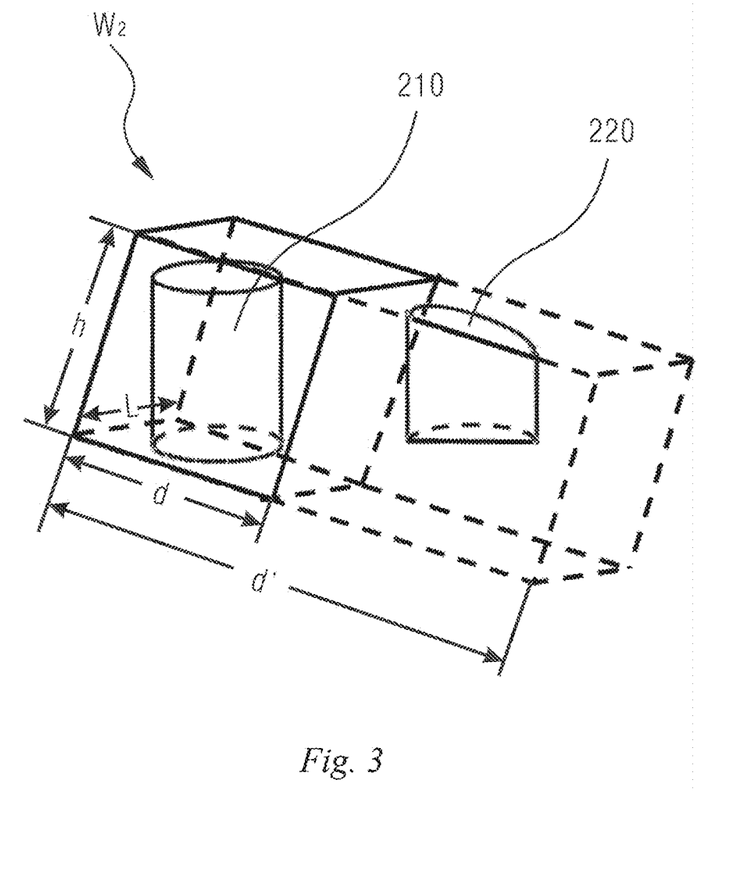
FIG. 3 is a schematic diagram of a target object of a point cloud model and a second segmentation window of a mechanism for segmenting a point cloud model according to a specific embodiment of the present invention.
Figure 4:
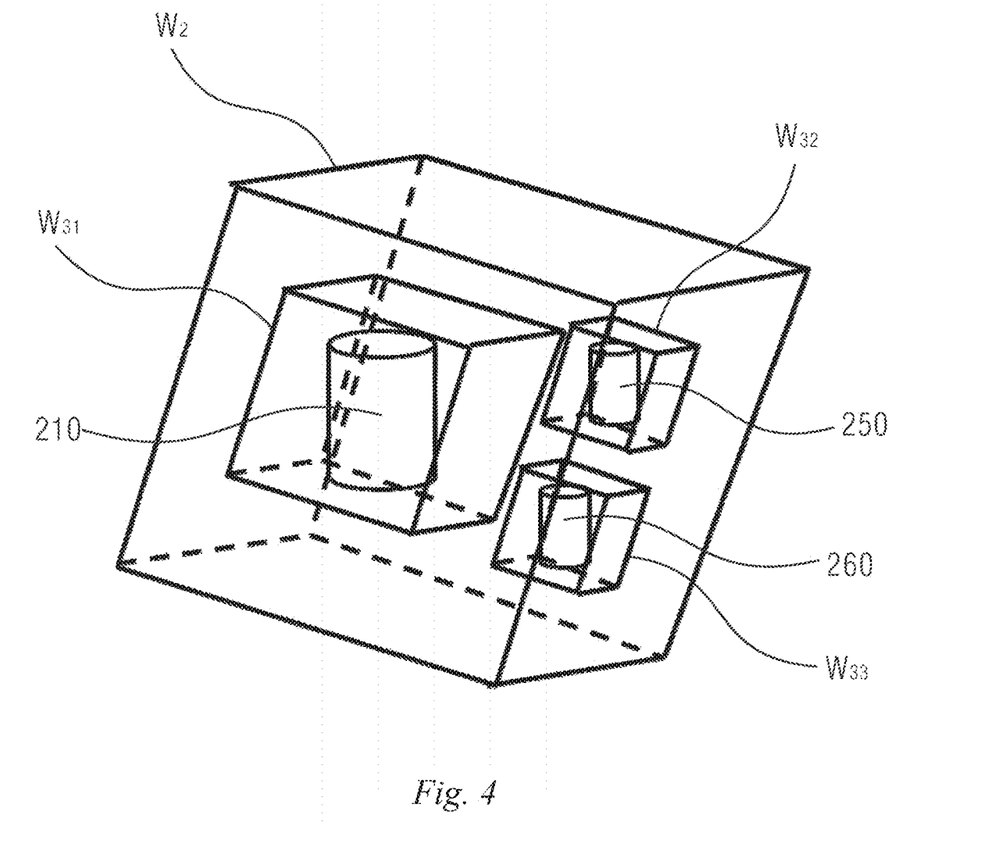
FIG. 4 is a schematic diagram of a target object of a point cloud model and a third segmentation window of a mechanism for segmenting a point cloud model according to a specific embodiment of the present invention.

It should be noted that the first cylinder 210, the second cylinder 220, the first cube 230, and the second cube 240 shown in FIG. 2 are all point cloud structures; all objects shown in FIGS. 3 and 4 are also point cloud structures. Point cloud structures are omitted for ease of illustration and brevity. In other words, parts of the first cylinder 210 and the second cylinder 220 in FIG. 3 are also point cloud structures, and the first cylinder 210, a first redundant point cloud structure 250, and a second redundant point cloud structure 260 in FIG. 4 are also all point cloud structures.

Specifically, the first segmentation apparatus 110 obtains a position of the mouse M relative to the screen S that is input by the user C via the keyboard K and the mouse M to generate a rectangular first segmentation window W1, where the first segmentation window W1 is two-dimensional, and has only a length l and a width h, and no depth. As shown in FIG. 2, the first cylinder 210 as the target object is accommodated in the first segmentation window W1. In addition, the first segmentation window W1 further includes some redundant point cloud structures (not shown).

Then, step S2 is performed. The depth adjustment apparatus 130 adjusts (e.g., adds) a depth of the first segmentation window, where the length, the width, and the depth of the first segmentation window constitute a three-dimensional second segmentation window, and the target object is located in the second segmentation window.

The depth adjustment apparatus 130 automatically generates a slider (not shown) for the user, and the user C slides the slider on the screen S via the mouse M to input a desired depth, where the slider may display two end values that are the least depth and the largest depth for the user to select. As shown in FIG. 3, a depth indicated by the slider before a user input is d', and after the user inputs the desired depth, the depth is adjusted from d' to d. In this case, the length l, the width h, and the depth d of the first segmentation window constitute a three-dimensional second segmentation window W2, and the first cylinder 210 as the target object is located in the second segmentation window W2. A part of the second cylinder 220 is originally in the segmentation window. In this case, the part of the second cylinder 220 is not accommodated in the second segmentation window W2 after the depth is adjusted.

In addition, the user C further may switch a field of view and an angle at which the point cloud model 200 is displayed on the screen S via the mouse M. In comparison, FIGS. 3 and 4 have different angles of view and angles for the point cloud model 200, and a depth of the second segmentation window W2 may be better adjusted by adjusting the angle of view and the angle.

After the user C selects the satisfactory depth, the generation apparatus 140 receives configurations and parameters of the downloading apparatus 120 and the depth adjustment apparatus 130 and generates the second segmentation window W2 serving as a limiting frame based on an input of the user.

Next, step S3 is performed. The second segmentation apparatus 150 identifies and marks all point cloud structures in the second segmentation window to form a plurality of three-dimensional third segmentation windows, where the target object is located in one of the third segmentation windows.

Step S3 may be implemented in many manners, such as a clustering manner, a deep learning manner, and a super-voxel clustering manner.

According to the clustering manner, step S3 further includes substeps S31, S32 and S33.

In substep S31, the number k of third segmentation windows is computed. As shown in FIG. 4, only a rough selection is made in the second segmentation window W2, in which the first cylinder 210 as the target object and other redundant point cloud structures are accommodated, where the redundant point cloud structures include the first redundant point cloud structure 250 and the second redundant point cloud structure 260. Each point cloud structure in the second window W2 is accommodated by a third segmentation window. Specifically, the first cylinder 210 is in the third segmentation window W31, the first redundant point cloud structure 250 is in the third segmentation window W32, and the second redundant point cloud structure 260 is in the third segmentation window W33, and therefore, k=3.

In substep S32, k points in all the point cloud structures in the second segmentation window are randomly selected as centroids, then distances from other points in all the point cloud structures to the centroids are computed by taking the seed centroids as cluster centers, and other points in all the point cloud structures are assigned to the closest centroid to form a cluster.

Steps S31 and S32 are iteratively performed until positions of the k centroids are no longer changed.

Finally, step S33 is performed. All the point cloud structures in the second segmentation window are identified and marked to form k three-dimensional third segmentation windows, where the k third segmentation windows include k clusters.

Figure 5:
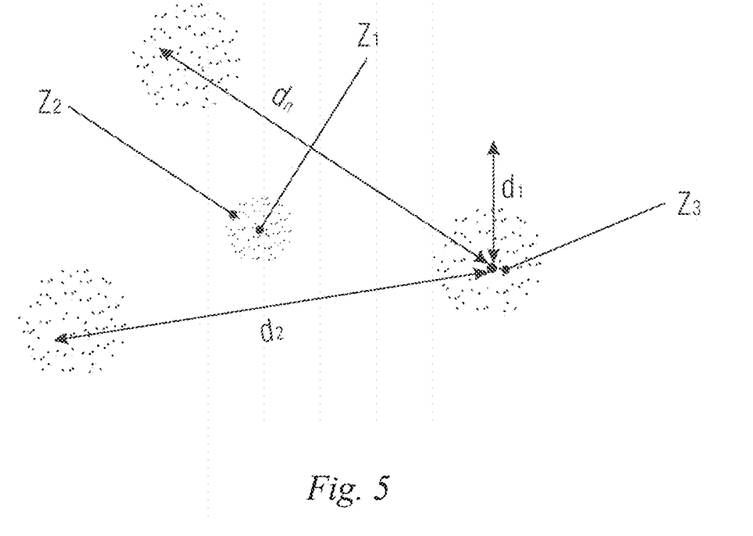
FIG. 5 is a schematic diagram of a clustering manner of a mechanism for segmenting a point cloud model according to a specific embodiment of the present invention.

Specifically, FIG. 5 shows a principle of the clustering manner, and in FIG. 5, a plurality of point cloud structures are included, where three points are selected as centroids: a first centroid $z1$, a second centroid $z2$, and a third centroid $z3$. Then, distances from other points in all the point cloud structures in FIG. 5 to the first centroid $z1$, the second centroid $z2$, and the third centroid $z3$ are respectively computed by using the first centroid $z1$, the second centroid $z2$, and the third centroid $z3$ as cluster centers. The third centroid $z3$ is taken as an example, distances between the third centroid $z3$ and all points in the point cloud structures are $d1, d2, \ldots, dn$ respectively, and then points closest to the third centroid $z3$ in other points in all the point cloud structures are assigned to form a cluster with the third centroid $z3$. By analogy, the first centroid $z1$ and the second centroid $z2$ each also form one cluster. In this case, three clusters have been obtained.

In this embodiment, any three points in all the point cloud structures in FIG. 4 are randomly selected as the centroids, and three clusters may be obtained through division according to the above principle of clustering and are respectively a first cluster of the first cylinder 210 as the target object, a second cluster of the first redundant point cloud structure 250, and a third cluster of the second redundant point cloud structure 260.

According to the deep learning manner, step S3 further includes the following steps: training a sample of the target object by using a data set of the target object, and comparing the target object by using the sample of the target object, so as to identify and mark all the point cloud structures in the second segmentation window to form the plurality of three-dimensional third segmentation windows, where the target object is located in one of the third segmentation windows.

According to the supervoxel clustering manner, the number of third segmentation windows are computed, then k points in all the point cloud structures in the second segmentation window are randomly selected as seed voxels, and utilize locally convex connected patches (LCCP) to mark concave-convex relations of different surfaces to divide points without intersecting regions in the second segmentation window into different supervoxel clusters, thereby identifying and marking all the point cloud structures in the second segmentation window to form k three-dimensional third segmentation windows, where the k third segmentation windows include k clusters.

Specifically, supervoxel clustering is that several seed voxels are selected, and then region growing is carried out to form large point cloud clusters, where points in each point cloud cluster are similar. Since supervoxel clustering is over-segmentation, that is, it is possible that adjacent objects are clustered together, supervoxel clustering segments the clustered objects into one object, then the LCCP mark the concave-convex relations of different surfaces, and then small regions are clustered into large objects by using a region growing algorithm. The region growing algorithm is limited by concavity and convexity, that is, regions are allowed to grow only across a convex edge. The first cylinder 210 and the first redundant point cloud structure 250 in the figure may be segmented into different point clouds by separate supervoxel clustering since there are no intersecting regions.

Specifically, in this embodiment, a plurality of pieces of data related to the first cylinder 210 (e.g., a computer aided design (CAD) model of the first cylinder 210) is used as a data set to train a sample of the first cylinder 210, and the sample is used to compare the first cylinder 210, so as to identify and mark all the point cloud structures in the second segmentation window to form a plurality of three-dimensional third segmentation windows, where the first cylinder 210 is located in one of the third segmentation windows. Object recognition is based on the fact that the user knows what target object the user desires to find, the target object has a boundary, the target object is greatly different from other impurities, and on this basis, the target object and the impurities are distinguished in a dichotomy manner. A large amount of data is used to train features of an object, the sample has a corresponding label each time, and results are continuously compared with the labels in a training process, thereby reducing errors.

Finally, step S4 is performed. The computing apparatus 160 computes a volume proportion of a point cloud structure in each third segmentation window relative to the second segmentation window, selects a third segmentation window having the largest volume proportion, and determines that the point cloud structure in the third segmentation window is the target object.

The computing apparatus 160 separately computes volumes of the first cylinder 210, the first redundant point cloud structure 250, and the second redundant point cloud structure 260. It is assumed that the volume of the first cylinder 210 in the third segmentation window W31 is V1, the volume of the first redundant point cloud structure 250 in the third segmentation window W32 is V2, and the volume of the second redundant point cloud structure 260 in the third segmentation window W33 is V3. Herein, the volume of the second segmentation window W2 is V, and therefore, the volume proportion of the first cylinder 210 is $V_1/V$, and the volume proportions of the first redundant point cloud structures 250 and the second redundant point cloud structures 260 are $V_2/V$ and $V_3/V$, respectively. When $V_1/V > V_2/V$ and $V_1/V > V_3/V$, the third segmentation window having the largest volume proportion is determined and it is determined that the point cloud structure in the third segmentation window is the target object, that is, the first cylinder 210 is the target object.

The third segmentation window is smaller than the second segmentation window, and the second segmentation window is smaller than the first segmentation window (e.g., smaller than W2 with depth d', as shown in FIG. 3). Thus, the target object 180 recommended by the recommendation apparatus 170 is recommended to the client C, and the target object is the first cylinder 210.

A second embodiment of the present invention provides a system for segmenting a point cloud model, the system including: a processor; and a memory coupled to the processor, where the memory stores instructions that, when executed by the processor, cause the electronic device to perform actions including: S1, selecting a point cloud structure including a target object from a point cloud model by using a two-dimensional first segmentation window, where the first segmentation window has a length and a width; S2, adjusting (e.g., adding) a depth of the first segmentation window, where the length, the width, and the depth of the first segmentation window constitute a three-dimensional second segmentation window, and the target object is located in the second segmentation window; S3, identifying and marking all point cloud structures in the second segmentation window to form a plurality of three-dimensional third segmentation windows, where the target object is located in one of the third segmentation windows; and S4, computing a volume proportion of a point cloud structure in each third segmentation window relative to the second segmentation window, selecting a third segmentation window having the largest volume proportion, and determining that the point cloud structure in the third segmentation window is the target object, where the third segmentation window is smaller than the second segmentation window, and the second segmentation window is smaller than the first segmentation window (e.g., smaller than W2 with depth d', as shown in FIG. 3).

Further, action S3 further includes: S31, computing the number k of third segmentation windows; S32, randomly selecting k points in all the point cloud structures in the second segmentation window as centroids, then computing distances from other points in all the point cloud structures to the centroids by taking the seed centroids as cluster centers, assigning other points in all the point cloud structures to the closest centroid to form a cluster, and iteratively performing steps S31 and S32 until positions of the k centroids are no longer changed; and S33, identifying and marking all the point cloud structures in the second segmentation window to form k three-dimensional third segmentation windows, where the k third segmentation windows include k clusters.

Further, action S3 further includes: training a sample of the target object by using a data set of the target object, and comparing the target object by using the sample of the target object, so as to identify and mark all the point cloud structures in the second segmentation window to form the plurality of three-dimensional third segmentation windows, where the target object is located in one of the third segmentation windows.

A third embodiment of the present invention provides an apparatus for segmenting a point cloud model, the apparatus including: a first segmentation apparatus configured to select a point cloud structure including a target object from a point cloud model by using a two-dimensional first segmentation window, where the first segmentation window has a length and a width; a depth adjustment apparatus configured to adjust (e.g., add) a depth of the first segmentation window, where the length, the width, and the depth of the first segmentation window constitute a three-dimensional second segmentation window, and the target object is located in the second segmentation window; a second segmentation apparatus configured to identify and mark all point cloud structures in the second segmentation window to form a plurality of three-dimensional third segmentation windows, where the target object is located in one of the third segmentation windows; and a computing apparatus configured to compute a volume proportion of a point cloud structure in each third segmentation window relative to the second segmentation window, select a third segmentation window having the largest volume proportion, and determine that the point cloud structure in the third segmentation window is the target object, where the third segmentation window is smaller than the second segmentation window, and the second segmentation window is smaller than the first segmentation window (e.g., smaller than W2 with depth d', as shown in FIG. 3).

Further, the second segmentation apparatus is further configured to compute the number k of third segmentation windows, randomly select k points in all the point cloud structures in the second segmentation window as centroids, then compute distances from other points in all the point cloud structures to the centroids by taking the seed centroids as cluster centers, assign other points in all the point cloud structures to the closest centroid to form a cluster until positions of the k centroids are no longer changed, and identify and mark all the point cloud structures in the second segmentation window to form k three-dimensional third segmentation windows, where the k third segmentation windows include k clusters.

Further, the second segmentation apparatus is further configured to train a sample of the target object by using a data set of the target object, and compare the target object by using the sample of the target object, so as to identify and mark all the point cloud structures in the second segmentation window to form the plurality of three-dimensional third segmentation windows, where the target object is located in one of the third segmentation windows.

A fourth embodiment of the present invention provides a computer program product tangibly stored on a computer-readable medium and including computer executable instructions that, when executed, cause at least one processor to perform the method according to the first embodiment of the present invention.

A fifth embodiment of the present invention provides a computer-readable medium storing computer executable instructions that, when executed, cause at least one processor to perform the method according to the first embodiment of the present invention.

A mechanism for segmenting a point cloud model according to the present invention may consider originally omitted depth information of a 3D point cloud model, and the present invention may automatically screen out a target object and send same to a client. In addition, the present invention utilizes a clustering manner, a deep learning manner, etc. to screen the target object.

Although the content of the present invention has been described in detail through the preferred embodiments above, it should be appreciated that the description above should not be considered as a limitation to the present invention. Various modifications and substitutions to the present invention will be apparent after perusal of the content above by those skilled in the art. Thus, the scope of protection of the present invention should be defined by the appended claims. In addition, any reference sign in the claims should not be construed as limiting the claims involved. The term "include/comprise" does not exclude other apparatuses or steps not listed in the claims or the specification. The terms "first", "second", etc., are only used to refer to names, and do not denote any particular order.

The invention claimed is:

1. A method for segmenting a point cloud model, the method comprising:
    selecting a point cloud structure including a target object from a point cloud model using a two-dimensional first segmentation window, the first segmentation window including a length and a width;
    adding a depth to the first segmentation window, wherein the length, the width, and the depth of the first segmentation window constitute a three-dimensional second segmentation window, and the target object is located in the second segmentation window;
    identifying and marking all point cloud structures in the second segmentation window to form a plurality of three-dimensional third segmentation windows including the target object, by
    computing a number k of the plurality of third segmentation windows,
    randomly selecting k points m all point cloud structures in the second segmentation window as centroids,
    computing distances from other points in all the point cloud structures to the centroids by taking seed centroids as cluster centers,
    assigning other points in all the point cloud structures to a relatively closest centroid to form a cluster,
    iteratively performing the computing and randomly selecting until positions of the k centroids are no longer changed, and
    identifying and marking all the point cloud structures in the second segmentation window to form k three-dimensional third segmentation windows,
    wherein the k third segmentation windows comprise k clusters;
    computing a volume proportion of a point cloud structure in each respective third segmentation window of the plurality of third segmentation windows, relative to | the second segmentation window;
    selecting the respective third segmentation window, of the plurality of third segmentation windows, having a relatively largest volume proportion; and
    determining that the point cloud structure in the selected third segmentation window is the target object, wherein the third segmentation window is relatively smaller than the second segmentation window.

2. The method for segmenting a point cloud model of claim 1, wherein the identifying and marking further comprises:
    training a sample of the target object using a data set of the target object; and
    identifying and marking, based on the target object and the sample of the target object, all the point cloud structures in the second segmentation window to form the plurality of three-dimensional third segmentation windows, wherein the target object is located in one of the plurality of third segmentation windows.

3. A system for segmenting a point cloud model, comprising: a processor; and a memory coupled to the processor, the memory storing instructions that, when executed by the processor, cause the system to select a point cloud structure including a target object from a point cloud model by using a two-dimensional first segmentation window, the first segmentation window including a length and a width;

add a depth to the first segmentation window, wherein the length, the width, and the depth of the first segmentation window constitute a three-dimensional second segmentation window, and the target object is located in the second segmentation window;

identify and mark all point cloud structures in the second segmentation window to form a plurality of three-dimensional third segmentation windows including the target object, by computing a number k of the plurality of third segmentation windows, randomly selecting k points m all point cloud structures in the second segmentation window as centroids, computing distances from other points in all the point cloud structures to the centroids by taking seed centroids as cluster centers, assigning other points in all the point cloud structures to a relatively closest centroid to form a cluster, iteratively performing the computing and randomly selecting until positions of the k centroids are no longer changed, and identifying and marking all the point cloud structures in the second segmentation window to form k three-dimensional third segmentation windows, wherein the k third segmentation windows comprise k clusters;

compute a volume proportion of a point cloud structure in each respective third segmentation window of the plurality of third segmentation windows, relative to l the second segmentation window;

select the respective third segmentation window, of the plurality of third segmentation windows, having a relatively largest volume proportion; and determine that the point cloud structure in the selected third segmentation window is the target object, wherein the third segmentation window is relatively smaller than the second segmentation window.

4. The system for segmenting a point cloud model of claim 3, wherein the instructions, when executed by the processor, further cause the system to:

train a sample of the target object using a data set of the target object; and to identify and mark, based on the target object and the sample of the target object, all the point cloud structures in the second segmentation window to form the plurality of three-dimensional third segmentation windows, wherein the target object is located in one of the plurality of third segmentation windows.

5. An apparatus for segmenting a point cloud model, comprising:

a first segmentation apparatus configured to select a point cloud structure including a target object from a point cloud model by using a two-dimensional first segmentation window, the first segmentation window including a length and a width;

a depth adjustment apparatus configured to add a depth to the first segmentation window, wherein the length, the width, and the depth of the first segmentation window constitute a three-dimensional second segmentation window, the target object being located in the second segmentation window;

a second segmentation apparatus configured to identify and mark all point cloud structures in the second segmentation window to form a plurality of three-dimensional third segmentation windows including the target object, by computing a number k of the plurality of third segmentation windows, randomly selecting k points in all point cloud structures in the second segmentation window as centroids, computing distances from other points in all the point cloud structures to the centroids by taking seed centroids as cluster centers, assigning other points in all the point cloud structures to a relatively closest centroid to form a cluster, iteratively performing the computing and randomly selecting until positions of the k centroids are no longer changed, and identifying and marking all the point cloud structures in the second segmentation window to form k three-dimensional third segmentation windows, wherein the k third segmentation windows comprise k clusters; and a computing apparatus configured to compute a volume proportion of a point cloud structure in each respective third segmentation window relative to the second segmentation window, select the respective third segmentation window, of the plurality of third segmentation windows, having a relatively largest volume proportion, and determine that the selected point cloud structure in the third segmentation window is the target object, wherein the third segmentation window is relatively smaller than the second segmentation window.

6. The apparatus for segmenting a point cloud model of claim 5, wherein the second segmentation apparatus is further configured to;

train a sample of the target object using a data set of the target object; and identify and mark, based on the target object and the sample of the target object, all the point cloud structures in the second segmentation window to form the plurality of three-dimensional third segmentation windows, wherein the target object is located in one of the plurality of third segmentation windows.

7. A computer program product tangibly stored on a non-transitory computer-readable medium, and including computer executable instructions that, when executed by at least one processor, cause the at least one processor to perform the method of claim 1.

8. A non-transitory computer-readable medium storing computer executable instructions that, when executed by at least one processor, cause at least one processor to perform the method according to claim 1.

9. A computer program product tangibly stored on a non-transitory computer-readable medium, and including computer executable instructions that, when executed by at least one processor, cause the at least one processor to perform the method of claim 2.

10. A non-transitory computer-readable medium storing computer executable instructions that, when executed by at least one processor, cause at least one processor to perform the method according of claim 2.

\* \* \* \* \*